United States Patent [19]

DeBoer et al.

[11] Patent Number: 4,726,809

[45] Date of Patent: Feb. 23, 1988

[54] TEXTILE SIZE

[75] Inventors: Edward D. DeBoer, Sauk Village; Kenneth R. Yahl, Orland Park, both of Ill.

[73] Assignee: American Maize-Products Company, Stamford, Conn.

[21] Appl. No.: 865,085

[22] Filed: May 19, 1986

[51] Int. Cl.$^4$ .......................... D06Q 1/02; D06M 9/00
[52] U.S. Cl. ....................................... 8/115.6; 8/115.7; 252/8.8; 252/8.9; 106/210; 106/213; 536/45; 536/49; 524/47; 524/50; 524/51
[58] Field of Search ................. 106/210, 213; 536/45, 536/49, 50, 102, 108, 111; 8/115.7, 115.8; 252/8.8, 8.9; 524/47, 50, 51; 427/394

[56] References Cited

U.S. PATENT DOCUMENTS

| | | | |
|---|---|---|---|
| 2,876,217 | 3/1959 | Paschall | 260/233.3 |
| 3,017,294 | 1/1962 | Meisel | 117/139.5 |
| 3,022,289 | 2/1962 | Tuschhoff et al. | 260/233.5 |
| 3,081,296 | 3/1963 | Smith et al. | 260/233.5 |
| 3,336,292 | 10/1967 | Kirby | 260/233.3 |
| 3,388,120 | 6/1968 | Lotzgesell et al. | 260/233.3 |
| 3,793,310 | 2/1974 | Elizer | 260/233.3 |
| 3,887,752 | 6/1975 | Elizer | 428/378 |
| 4,029,885 | 6/1977 | Buikema | 536/50 |
| 4,239,592 | 12/1980 | Gaspar et al. | 106/210 |
| 4,464,528 | 8/1984 | Tasset | 536/50 |
| 4,552,564 | 11/1985 | DeBoer et al. | 8/115.6 |

*Primary Examiner*—Josephine L. Barr
*Attorney, Agent, or Firm*—Lucas & Just

[57] ABSTRACT

A novel starch used in a size composition is disclosed. The novel starch is a quaternary ammonium ether and acyl ester of starch which has a DS of quaternary ammonium ether of between 0.02 to 0.2 and a DS of acyl ester of between 0.01 to 0.3. The size composition is made from the novel starch and polyvinyl alcohol in a ratio of starch:polyvinyl alcohol of between 1:9 to 10:0. The method of making the size composition and the method of applying the size composition to the yarn is disclosed.

19 Claims, No Drawings

TEXTILE SIZE

The present invention relates to textile size compositions and more particularly to a novel starch derivative and a size composition containing the starch derivative. The starch derivative is a cationic-nonionic starch derivative.

Acid-thinned starch has been the ingredient of choice in the past for predominantly starch formulations of sizes for cotton warps and for weaving on shuttle looms, primarily because of its low price. It performed well enough on cotton yarn woven with traditional, shuttle-type looms.

With the advent of synthetic fibers such as polyester and nylon, and the use of high-speed shuttleless weaving technology, higher performance was required in the sizes used. Polyvinyl alcohol (PVOH) became a preferred ingredient in size compositions because of its excellent adhesion to synthetic fibers and flexibility of its films. PVOH has some disadvantages, such as high cost and the high dry-breaking strength it gives to the warp. If the dry-breaking strength is too high, the warp becomes difficult to split at the breaker bars of the slasher.

Acid-thinned starch has been used with PVOH to reduce size cost and to decrease the high dry breaking strength of PVOH-sized warps But acid-thinned starch is not compatible with PVOH, so it causes a decrease in the adhesion of size to the warp. This, in turn, leads to a decline in the quality of the sized warp, and unacceptable decreases in weaving efficiency. Acid-thinned common corn starch contains underivatized amylose, which retrogrades rapidly upon cooling. This retrogradation changes the functional properties of the size solution. Retrogradation is an irreversible process, so it makes the reuse of size after storage or aging impossible. Retrogradation also impedes the desizing process, as well as any attempts to reconcentrate the size for reuse. Thus, conventional starch must be discarded after one use.

A new starch derivative has now been discovered which alleviates a number of the problems experienced with acid-thinned starches. The new starch derivative is especially useful for cotton and cotton-synthetic blends of yarn woven on high-speed shuttleless looms. The new starch derivative of the present invention may be used in conjunction with the polyvinyl alcohol as a size composition.

The size formulation of the present invention is better than other known size formulations because it combines PVOH compatibility with the other characteristics required of a high-performance textile size; namely, appropriate strength and flexibility on the yarn, adhesion to the yarn, resistance to abrasion, control of penetration into and encasement of the yarn, and viscosity stability. Resistance to retrogradation allows the formulation to be reconcentrated and for the concentrated pastes to be stored between uses.

The new starch derivative of the present invention has been found to decrease the amount of PVOH used in the size composition while still producing good results. The starch derivative of the present invention is a cationic ether-nonionic ester of starch. The cationic ether radical is a quaternary ammonium alkyl ether while the nonionic ester is an acyl ester.

The starch derivative has a degree of substitution (hereinafter DS) with quaternary ammonium alkyl ether of about 0.02 to about 0.2 and more preferred a DS of about 0.03 to about 0.07.

The starch derivative has a DS with acyl ester of about 0.01 to about 0.3 an more preferred of about 0.03 to about 0.1.

The starch derivative of the present invention is incorporated into a size composition which may contain polyvinyl alcohol. Size compositions made in accordance with the present invention containing both the starch derivative of the present invention and PVOH contain a weight ratio of starch derivative: polyvinyl alcohol of about 1:9 to about 10:0. The preferred ratio of starch derivative: polyvinyl alcohol is about 1:1 to about 3:1.

Size compositions prepared in accordance with the present invention have a solids content of about 5 to about 30% by weight total solids and more preferred is a solids content of about 8% to about 25% by weight total solids. Generally the size composition is prepared with water as the liquid. Plasticizers may be added to the size composition.

In order to prepare the starch derivative of the present invention, two successive reactions are performed. First the starch is etherified with a quaternary ammonium salt and subsequently the quaternary ammonium etherified starch is esterified to acylate the starch and form a quaternary ammonium alkyl ether-acyl ester of starch.

Generally, the starch derivative of the present invention is prepared by forming an aqueous slurry of starch and then reacting the starch with a quaternary ammonium etherifying reagent in the presence of an alkaline catalyst. This reaction is generally carried out at about 45° C. for a period of about 16 hours. The slurry is then cooled and an esterifying reagent is added. After a short period of time the slurry is dewatered, washed and dried.

The first step of modifying the starch to make a quaternary ammonium ether is suitably prepared according to the teaching of U.S. Pat. No. 2,876,217 issued March 3, 1959 or U.S. Pat. No. 3,336,292 issued August 15, 1967. Both U.S. Pat. Nos. 2,876,217 and 3,336,292 are incorporated herein by reference.

U.S. Pat. No. 2,876,217 teaches reacting an epoxide etherifying agent with starch. The etherifying agent has been formed by reacting an epihalohydrin with a tertiary amine or tertiary amine salt. These reaction products or epoxide etherifying agents are typically represented by the structural formula of:

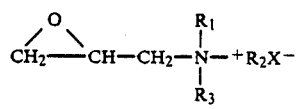

where X is the halide from the epihalohydrin and $R_1$, $R_2$ and $R_3$ are from the group consisting of alkyl, substituted alkyl, alkene aryl and aralkyl, but if all three of $R_1$, $R_2$ and $R_3$ are the same, they each should contain not more than 4 carbon atoms. If $R_1$, $R_2$ and $R_3$ are not the same and if $R_3$ contains up to 18 carbon atoms, then $R_1$ and $R_2$ should preferably be from the group consisting of methyl and ethyl and if $R_1$ and $R_2$ are joined to form a ring then $R_3$ should preferably be from the group consisting of methyl and ethyl.

The epoxide etherifying agent is then reacted with the starch in the presence of an alkaline catalyst such as sodium hydroxide. The resulting starch product is typically represented by the structural formula:

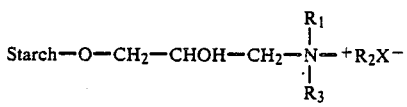

As is apparent from the structural formula above, a cation is formed.

U.S. Pat. No. 3,336,292 teaches reacting an etherifying agent containing a quaternary ammonium group with starch in an aqueous slurry in an alkaline environment. The etherifying agent is typically represented by the structural formula:

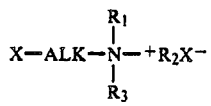

where X is a halogen and $R_1$, $R_2$ and $R_3$ is an alkyl or hydroxyalkyl group containing up to two carbon atoms such as methyl or ethyl or hydroxyethyl and ALK is an alkyl or alkylene group containing solely carbon and hydrogen and at least three but not over five carbons.

The starch product produced when the etherifying agent is reacted with the starch in an alkaline environment typically has a structural formula:

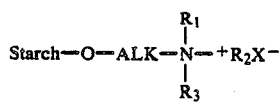

As is apparent from the structural formula above, a cation is formed.

Hereinafter in both the specification and claims the quaternary ammonium alkyl ether starch product made in accordance with the present invention will be represented by the structural formula:

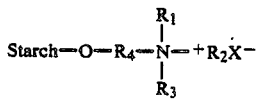

wherein $R_1$, $R_2$ and $R_3$ are selected from the group consisting of alkyl, alkylene acyl and aralkyl; and $R_4$ is selected from the group consisting of an alkyl, hydroxyalkyl, alkylene and hydroxyalkylene containing at least 3 but not over 5 carbons. As is apparent this structural formula also represents a cation.

It is preferred that $R_1$, $R_2$ and $R_3$ are alkyl or alkylene group of 4 carbons or less and good commercial results have been achieved when $R_1$, $R_2$ and $R_3$ are methyl or ethyl group. The halide is preferably chloride or bromide.

Good results have been achieved when the quaternary ammonium ether is 3-chloro-2-hydroxypropyl trimethyl ammonium chloride, 2,3-epoxypropyl, triethyl ammonium halide and 3-halopropyl trimethyl ammonium halide. The quaternary ammonium ether is preferably 3-chloro-2-hydroxypropyl trimethyl ammonium chloride.

The second step, esterification, is carried out by reacting the quaternary ammonium etherified starch with an esterifying reagent. This step is suitably accomplished by following the teachings of U.S. Pat. No. 3,022,289 issued Feb. 20, 1962 which is incorporated herein by reference.

U.S. Pat. No. 3,022,289 teaches reacting a starch with a vinyl ester of a carboxylic acid in the presence of an alkaline catalyst and water. There are other conventional acylating chemicals, such as acid anhydrides or acid halides. Any of these are suitable for the purposes of this invention, and all are well-known to those skilled in the art as well as the method for acylating the starch using these chemical reagents.

Suitable vinyl esters for the second step are vinyl formate, vinyl acetate and vinyl propionate. Vinyl acetate is preferred. Suitable acid anhydrides include acetic, propionic, butyric and benzoic anhydrides. Suitable acid halides include acetyl chloride and benzoyl chloride.

The acylated starch ester is represented by the structural formula:

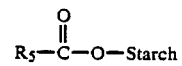

wherein $R_5$ is selected from the group consisting of alkyl, alkylene, aryl and aralkyl group. Preferably $R_5$ is an alkyl or alkylene of no more than 4 carbons.

The overall structural formula of the starch derivative of the present invention is:

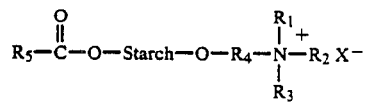

wherein $R_1$, $R_2$, $R_3$ and $R_5$ are selected from the group consisting of alkyl, alkylene, aryl, aralkyl; $R_4$ is selected from the group consisting of alkyl, hydroxyalkyl, alkylene and hydroxyalkylene containing at least 3 but not over 5 carbons; and X is a halide. As is apparent the structure is cationic. The quaternary ammonium ether group and the acyl ester group are generally not bonded to the same anhydroglucose unit of the starch molecule.

Preferably $R_1$, $R_2$ and $R_3$ are alkyl or alkylene containing no more than 4 carbons and most preferred are methyl and ethyl. The preferred halides are chlorine and bromine. $R_5$ is preferably an alkyl or alkylene of no more than 4 carbons. $R_4$ preferably contains 3 carbons.

In order to prepare the starch derivative of the present invention, waxy or non-waxy starch is used. The starch is also independent of its vegetable origin e.g. whether derived from corn, sorghum, wheat, rice, potato, etc. Common corn starch is preferred.

The starting starch used for making the present invention is generally in unswollen granular form. Suitable starches for use as starting materials also include starches where the granular structure is slightly modified by acid-thinning, enzyme-thinning, oxidizing and the like. Unmodified starch granules are also used.

A good may to monitor the degree of thinning which occurs to the granular starch prior to etherification with quaternary ammonium ether is to measure the fluidity of the starch. The fluidity method is a standard measurement well-known to those of skill in the art. The method employed for the measurements provided for herein entails placing a 18.90 gram (db.) sample of modified starting starch in a beaker to which is added 150 ml water. The water and starch mixture is stirred manually to make a uniform slurry. Then 150 ml of 3.6% sodium hydroxide is added, and the mixture is stirred for one minute. The solution thereby obtained is allowed to rest in a 75° F. water bath for 29 minutes. It is then poured into a standard fluidity funnel having a specific "water time" of between about 59 and 61 seconds, "water time" being the time it takes 100 ml of water to flow through the funnel. The number of milliliters of starch slurry that passes through the funnel in the water time is the fluidity of the starch. Unmodified starch has a fluidity of about 0 to about 5 ml when measured in this manner. For good results, the starting starch material for the present invention should have a fluidity of between about 45 ml to about 90 ml. Preferably the starting material is common corn starch which has been acid thinned to a fluidity of about 65 to 75 ml.

The size composition can suitably be prepared by blending the starch derivative with the polyvinyl alcohol and cooking at the desired solids content level by heating in water, either batchwise or continuously. Alternatively, the starch derivative and polyvinyl alcohol can be cooked separately, then blended together. The preferred temperature at which the modified starch or the size composition is cooked will completely gelatinize the starch derivative. This temperature, in general, is about 65° C. and higher.

The range of total solids content in the size composition will vary depending upon use. In general, it is of advantage to use as high a solids content as possible to decrease evaporation costs with an upper limit being defined by the viscosity of the composition. The viscosity of the composition is a factor because of equipment constraints and the effects of viscosity on the rate and amount of size penetration into the fiber bundles. Generally speaking and using present technology, i.e. the high pressure squeeze roll slasher, a range between about 5 to about 30% with a preferred range between about 8 to about 25% total solids content by weight can be employed. The size solution of the present invention can include other minor ingredients which are typically used in sizes such as waxes, antiseptics, defoamers, antistatic agents, softeners, plasticizers, etc. However, it is preferred that starch-degrading enzymes not be included since they may tend to interfere with recovery of used size material.

Any grade of polyvinyl alcohol can be used in the present invention. Low viscosity grades of polyvinyl alcohol are preferred.

The ratio of starch derivative to polyvinyl alcohol is suitably between 1:9 and 10:0.

The preferred ratio of starch derivative to polyvinyl alcohol will vary depending upon the conditions and economy of use. Different fibers will require different ratios. However, in most cases the range should be between about 1:1 to about 3:1 starch derivative: polyvinyl alcohol. These ratios are by weight of starch derivative and polyvinyl alcohol.

The starch size can be applied to a textile warp in any known manner. It is preferred that a high pressure squeeze roll slasher be employed since this has been found to give very good results.

After the fabric is woven, it has been found that the size can be readily removed using hot water, preferably about 80° C. or hotter. The desize liquor can be reconcentrated to the desired solids content level using standard ultra-filtration techniques. This reconcentrated composition of the present invention can then be used again to size further warp yarns.

These and other details and advantages of the present invention may be more fully understood with respect to the following preferred examples chosen for illustration.

EXAMPLE 1

This example illustrates preparation of the starch derivative of the present invention.

A slurry of common corn starch of about 22.9° Be (correct to 60° F.) was prepared. To this slurry was added hydrochloric acid (HCL) in an amount such that 10 ml of slurry could be neutralized by 10 ml of 0.1N NaOH (the slurry pH was about 0.8 after the acid was added). The acidified slurry was heated to 46° C. and held until the starch was thinned to a 74 ml fluidity. Fifty (50) pounds of sodium chloride (NaCl) was then added as a gelatinization inhibitor, after which 70.0 pounds of a 53% solution of 3-chloro-2-hydroxypropyl trimethyl ammonium chloride (a quaternary ammonium ether-forming reagent) was added. Then a 4% NaOH solution was added until 10 ml of slurry could be neutralized by 11.5 ml of 0.1N HCL (slurry pH was about 11.5 after all the NaOH was added). Then the slurry temperature was maintained at 43° C. for 16 hours.

After 16 hours the slurry was cooled to 25° C. and 37.0 pounds of vinyl acetate (esterifying reagent) was added. Ten minutes after the addition of the vinyl acetate the slurry was adjusted to a pH of 5.5 with hydrochloric acid (HCl).

The slurry was dewatered and the resulting product washed with fresh water and dried. The starch derivative obtained from such a process had a quaternary ammonium DS of 0.033 and an acyl DS of 0.053.

EXAMPLE 2

This example illustrates another way to make the starch derivative of the present invention.

An acid thinned common corn starch having a 72 fluidity was slurried by adding 500 gram (db) of the acid thinned starch to water to produce a slurry of about 21.4° Bé (corrected to 60° F.). An alkaline catalyst was then added, 16.10 grams calcium hydroxide (Ca(OH)$_2$). After the addition of the alkaline catalyst, the slurry was heated to 45° C. and 70.03 grams of a 53% solution of 3-chlor-2-hydroxypropyl ammonium chloride (a quaternary ammonium ether) was added. The slurry was held at about 45° C. for 16 hours.

The slurry was then allowed to cool to 30° C. and 34.63 grams of acetic anhydride was added to the slurry. After five minutes, the pH of the slurry was 4.8.

The slurry was dewatered and the resulting product washed with fresh water and dried.

The starch derivative obtained from such a process had a quaternary ammonium DS of 0.040 and a acyl DS of 0.030.

EXAMPLE 3

In this example two size compositions made in accordance with the present invention were prepared and tested against polyvinyl alcohol alone. The results are as follows:

TABLE I

| Property of the Films | Size Compositions | | |
|---|---|---|---|
| | Comp. A | Comp. B | PVOH Alone |
| Tensile Yields (PSI) | 3865 | 3384 | 1620 |

TABLE I-continued

| Property of the Films | Size Compositions | | |
|---|---|---|---|
| | Comp. A | Comp. B | PVOH Alone |
| Tensile Rupture (PSI) | 3342 | 3125 | 3032 |
| Elongation (%) | 13.2 | 20.0 | 98.3 |
| Mylar Adhesion (lbs) | 0.432 | 0.484 | 0.087 |

Size composition A was prepared in accordance with the present invention by making up a slurry of the starch derivative from Example 1 with polyvinyl alcohol (PVOH) and water in a weight ratio starch derivative: PVOH: water of 6.0: 6.0: 88.0. The total solids content of the slurry was 12%. The slurry was then cooked at 205° F. for 30 minutes in a conventional cooking vessel. The cooking vessel was equipped with an impeller and during the cooking step the impeller was operated at 1000 rpm to subject the slurry to a high rate of shear. After cooking, water was added to the slurry to bring it back to its original solids level. This completely gelatinized the starch derivative. The paste was allowed to cool for one hour in a 150° F. water bath. It had a Brookfield viscosity of 75 cps. The viscosity was measured with a Brookfield Viscometer, Model RVF, using a No. 3 spindle at 20 RPM. This is a standard piece of laboratory equipment and standard procedures were used to obtain these measurements. The viscosity at 115° F. was 250 cps.

Size composition B was prepared in a similar manner except the starch derivative used in composition B was the product made in Example 2 above and the starch derivative: PVOH: water ratio was 7.5: 7.5: 85.0.

The polyvinyl alcohol used was of a commercial grade, fully hydrolyzed, low viscosity grade polyvinyl alcohol sold under the trademark ELVANOL T-66 by duPont. Films of the above size compositions were tested using the following procedures to obtain the data of Table 1 above: A Thwing-Albert Model 65 TM Tensile Tester with a 20 lb capacity load cell was used for all testing.

A. For Tensile Pulls:
Initial Jaw Gap=2.0 inches
Crosshead Speed=0.50 inches/minute
Chart range set at 50% of load cell capacity
Sample Width=15 mm.

B. For Mylar Adhesions:
Initial Jaw Gap=1.0 inch
Crosshead Speed=4.0 inches/minute
Chart range set at 5% of load cell capacity
Sample Width=1.5 inches C. Calculations:

$$\text{Yield and Rupture} = \frac{(169.33 \times \text{Chart Reading})}{\text{Sample Thickness in mils.}}$$  1

1 mil=0.001 inch.

Sample thickness is measured with a micrometer, at both ends and middle of sample. The three values are averaged for use in the calculation. The 169.33 is a factor which converts the chart reading in %, for the 15 mm wide sample, to lb/linear inch width. The chart reading was taken from the tensile tester machine.

2. Elongation=6.25×Length of the pull in inches. Length is defined as being from the beginning of the rise of the pen to the rupture point, as measured along the baseline of the chart. The 6.25 is a factor which converts the length of the pull as seen on the chart to the elongation, which is a percentage of the original sample length of 2 inches. It is necessary because of the difference between the chart and crosshead speeds.

3. Mylar Adhesion: Measure the chart reading at 3 inches into the pull, and divide by 100 to get Adhesion in pounds.

The analogy between film data and size performance is well-known to those skilled in the art.

It is readily apparent from the data above that the starch and PVOH composition of the present invention performs as well as PVOH by itself and, in certain regards, is superior thereto.

EXAMPLE 4

This example compares abrasion resistance of yarn sized with a size composition of the present invention with yarn sized with polyvinyl alcohol alone. Abrasion resistance is used to predict weavability of sized yarn prior to weaving. During the weaving process warp yarn is subject to abrasion as the weft yarn is passed back and forth through the loom and abrasion resistance helps to predict how well the yarn will withstand this type of abrasion.

The following size compositions were prepared:

TABLE II

| Component | Size I | Size II | Size III |
|---|---|---|---|
| Starch Derivative (lbs. d.b.) | 0 | 4.69 | 6.25 |
| PVOH (lbs. d.b.) | 8.40 | 4.69 | 3.13 |
| Plasticizer Urea (lbs.) | 0 | 0.816 | 0.816 |
| Wax (lbs. d.b.) | 0.588 | 0.714 | 0.714 |
| Water (lbs.) | 51.2 | 49.0 | 48.9 |

The starch derivative in each size composition in Table II above was the product of Example 1.

The polyvinyl alcohol was a fully hydrolyzed, low viscosity commercial grade PVOH sold under the trademark ELVANOL T-66 by duPont.

The wax was a commercial grade wax sold as #15 by J. P. Stevens. Wax is used in size to soften and lubricate the sized yarn and to prevent the size from adhering to the initial slasher drying cylinders. The only restriction on the wax used in this example and in this invention is that it not contain anionic polymers.

The size compositions of Table II above were cooked in a conventional cooker equipped with an impeller. The starch derivative, water and PVOH were added to the vessel and the slurry was cooked at 95° C. for 30 minutes. The impeller was operated during the cooking step to impart shear to the slurry. The wax was added to the size slurry before cooking. The starch derivative was completely gelatinized after the cooking step. The size compositions all had a total solids content of about 18% in the cooker.

Yarn was sized with three add-on levels. The yarn was 65% polyester and 35% cotton having a cotton count of 37 singles. A Calloway slasher was used to size the yarn. The size solutions were maintained at 165° F. The size solutions were 12 to 18% solids. The size add-on was determined in a conventional manner using standard extraction method.

The sized yarn was subject to K. Zweigle abrader, a conventional instrument used in the industry, and the number of cycles were recorded when the sized yarn broke. The tension on the sized yarn was 30 grams per yarn and 800 grit abrasive paper was used. The results of these tests are given below in Table III. The abrasion resistance is the mean of 40 threads and were conducted in standard room conditions of 70° F. at 65% relative humidity.

TABLE III

| Size | Size Add-on Level | Abrasion Resistance (Cycles to Break) |
|---|---|---|
| Size I | 17.1 | 143 |
| Size I | 14.0 | 116 |
| Size I | 12.8 | 110 |
| Size II | 20.7 | 113 |
| Size II | 17.9 | 102 |
| Size II | 13.8 | 87 |
| Size III | 15.0 | 81 |
| Size III | 12.5 | 71 |
| Size III | 10.9 | 81 |

Abrasion resistance is numerically related to the size add-on level. Therefore, in order to compare the raw data above, the abrasion resistance values were normalized to an add-on level of 14%. These values are listed in Table IV below:

TABLE IV

| Size | 14% Add-on Abrasion Resistance (Cycles to Break) |
|---|---|
| Size I | 118 |
| Size II | 88 |
| Size III | 78 |

Statistical evaluation of this data shows that either the size composition of the present invention or PVOH alone would provide the necessary abrasion resistance for good weavability of the tested yarn.

It will be understood that it is intended to cover all changes and modifications of the preferred embodiment of the present invention herein chosen for the purpose of illustration which do not constitute a departure from the spirit and scope of the invention.

What is claimed is:

1. A cationic-nonionic starch derivative having the following structural formula:

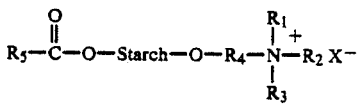

wherein $R_1$, $R_2$, $R_3$ and $R_5$ are selected from the group consisting of alkyl, alkylene, aryl and aralkyl; $R_4$ is selected from the group consisting of alkyl, hydroxyalkyl, alkylene and hydroxyalkylene and $R_4$ has at least 3 but not more than 5 carbons; X is a halide.

2. The starch derivative of claim 1 wherein $R_1$, $R_2$, $R_3$ and $R_5$ are selected from the group consisting of alkyl and alkylene containing no more than 4 carbons; $R_4$ contains 3 carbons and X is selected from the group of halides consisting of chloride or bromide.

3. The starch derivative of claim 2 wherein $R_1$, $R_2$ and $R_3$ are selected from the group consisting of methyl and ethyl.

4. The starch derivative of claim 1 wherein the starch is common corn starch.

5. The starch derivative of claim 2 wherein the starch is common corn starch.

6. The starch derivative of claim 1 wherein the starch derivative has a DS of quaternary ammonium ether groups is about 0.02 to about 0.2 and the DS of acyl ester groups is about 0.01 to 0.3.

7. The starch derivative of claim 2 wherein the starch derivative has a DS of quaternary ammonium ether groups is about 0.02 to about 0.2 and the DS of acyl ester groups is about 0.01 to 0.3.

8. The starch derivative of claim 6 wherein the DS of quaternary ammonium ether groups is about 0.03 to about 0.07 and the DS of acyl ester groups is about 0.03 to about 0.1.

9. The starch derivative of claim of 7 wherein the DS of quaternary ammonium ether groups is about 0.03 to about 0.07 and the DS of acyl ester groups is about 0.03 to about 0.1.

10. A cationic-nonionic starch derivative having the following structural formula:

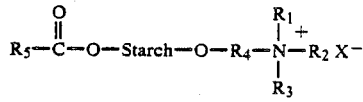

wherein $R_1$, $R_2$ and $R_3$ are selected from the group consisting of ethyl and methyl; $R_4$ is selected from the group consisting of propyl and hydroxypropyl; $R_5$ is a propyl group; X is selected from the group consisting of bromide and chloride; and wherein the starch derivative has a DS of quaternary ammonium ether is about 0.03 to about 0.07 and a DS of acyl ester of about 0.03 to about 0.01.

11. A composition for sizing yarn which comprises the cationic-nonionic starch derivative of claim 1; and polyvinyl alcohol, wherein the composition has a ratio of starch derivative: polyvinyl alcohol in the range of about 1:9 to about 10:0.

12. A composition for sizing yarn which comprises the cationic-nonionic starch derivative of claim 6; and polyvinyl alcohol, wherein the composition has a ratio of starch derivative: polyvinyl alcohol in the range of about 1:9 to about 10:0.

13. A composition for sizing yarn which comprises the cationic-nonionic starch of claim 10; and polyvinyl alcohol, wherein the composition has a ratio of starch derivative: polyvinyl alcohol in the range of about 1:1 to about 3:1.

14. A method for making a size composition comprising:
  (a) blending the cationic-nonionic starch derivative of claim 1 and polyvinyl alcohol wherein the composition has a ratio of starch derivative: polyvinyl alcohol in the range of about 1:9 to about 10:0; and
  (b) cooking said blend to a total solids content between about 5% to about 30%.

15. A method for making a size composition comprising:
  (a) blending the cationic-nonionic starch derivative of claim 6 and polyvinyl alcohol wherein the composition has a ratio of starch derivative: polyvinyl alcohol in the range of about 1:9 to about 10:0; and
  (b) cooking said blend to a total solids content between about 5% to about 30%.

16. A method for making a size composition comprising:
  (a) blending the cationic-nonionic starch derivative of claim 10 and polyvinyl alcohol wherein the composition has a ratio of starch derivative: polyvinyl alcohol in the range of about 1:1 to about 3:1; and (b) cooking said blend to a total solids content between about 8% to about 25%.

17. A method for sizing yarn which comprises:
(a) blending a composition comprising the cationic-nonionic starch derivative of claim 1 and polyvinyl alcohol wherein the composition has a ratio of starch derivative:polyvinyl alcohol in the range of about 1:9 to about 10:0;
(b) cooking said blended composition to a total solids content between about 5% to about 30%; and
(c) sizing the yarn with the cooked, blended composition.

18. A method for sizing yarn which comprises:
(a) blending a composition comprising the cationic-nonionic starch derivative of claim 6 and polyvinyl wherein the composition has a ratio of starch derivative:polyvinyl alcohol in the range of about 1:9 to about 10:0;
(b) cooking said blended composition to a total solids content between about 5% to about 30%; and
(c) sizing the yarn with the cooked, blended composition.

19. A method for sizing yarn which comprises:
(a) blending a composition comprising the cationic-nonionic starch derivative of claim 10 and polyvinyl alcohol wherein the composition has a ratio of starch derivative:polyvinyl alcohol in the range of about 1:1 to about 3:1;
(b) cooking the blended composition to a total solids content of between about 8% to about 25%; and
(c) sizing the yarn with the cooked, blended composition.

* * * * *